United States Patent [19]

Gupta

[11] 4,313,908

[45] Feb. 2, 1982

[54] CATALYTIC REACTOR HAVING BED BYPASS

[75] Inventor: Ramesh Gupta, Chatham Township, Morris County, N.J.

[73] Assignee: Exxon Research & Engineering Co., Florham Park, N.J.

[21] Appl. No.: 198,793

[22] Filed: Oct. 20, 1980

[51] Int. Cl.³ .............................. B01J 3/02; B01J 4/00; B01J 8/04; B01J 19/24

[52] U.S. Cl. ..................................... 422/111; 261/96; 261/97; 422/112; 422/191; 422/195; 422/217; 422/220

[58] Field of Search ............................... 422/110–112, 422/191, 195, 217, 220; 261/96, 97

[56] References Cited

U.S. PATENT DOCUMENTS

| | | | |
|---|---|---|---|
| 3,509,043 | 4/1970 | McMaster et al. | 422/191 |
| 3,524,731 | 8/1970 | Effron et al. | 422/220 |
| 3,598,539 | 8/1971 | Pizzato | 422/220 |
| 3,796,655 | 3/1974 | Armistead et al. | |
| 3,888,633 | 6/1975 | Grosboll et al. | 422/217 |
| 4,234,314 | 11/1980 | Jones | 422/111 |

*Primary Examiner*—Bradley Garris
*Attorney, Agent, or Firm*—Robert S. Salzman

[57] ABSTRACT

The invention is for a two phase gas and liquid mixture reacting in an improved fixed bed reactor having at least one auxiliary bed disposed above the main bed. The auxiliary beds each have separate liquid and gas bypasses comprising hollow tubing of relatively different lengths extending through the auxiliary bed. The gas bypass tubing projects to a greater height above the auxiliary bed than the liquid bypass tubing. This tubing bypass arrangement allows for a low pressure drop bypass of the auxiliary bed to the main bed by the liquid and gas when the auxiliary bed becomes fouled.

13 Claims, 6 Drawing Figures

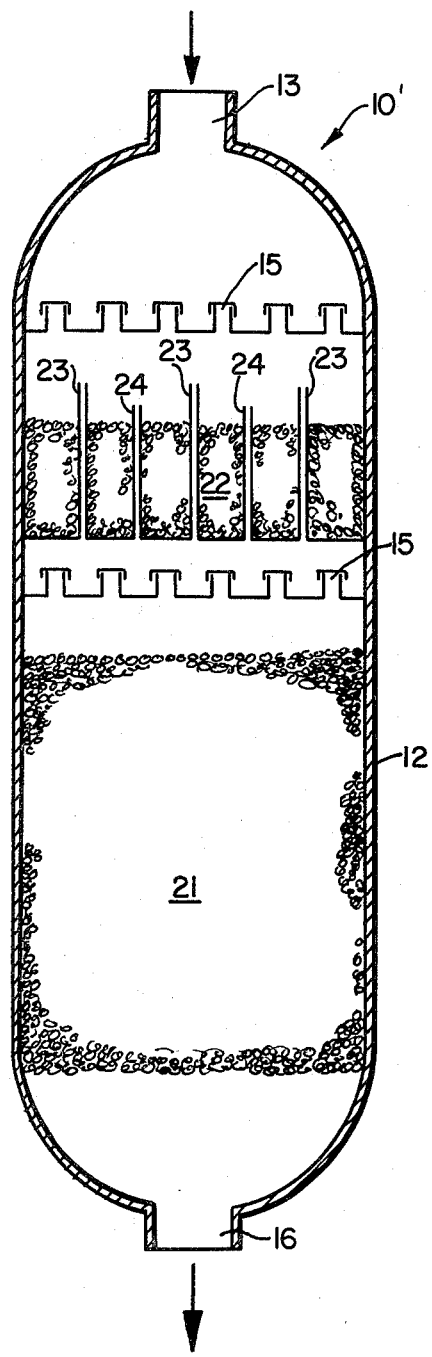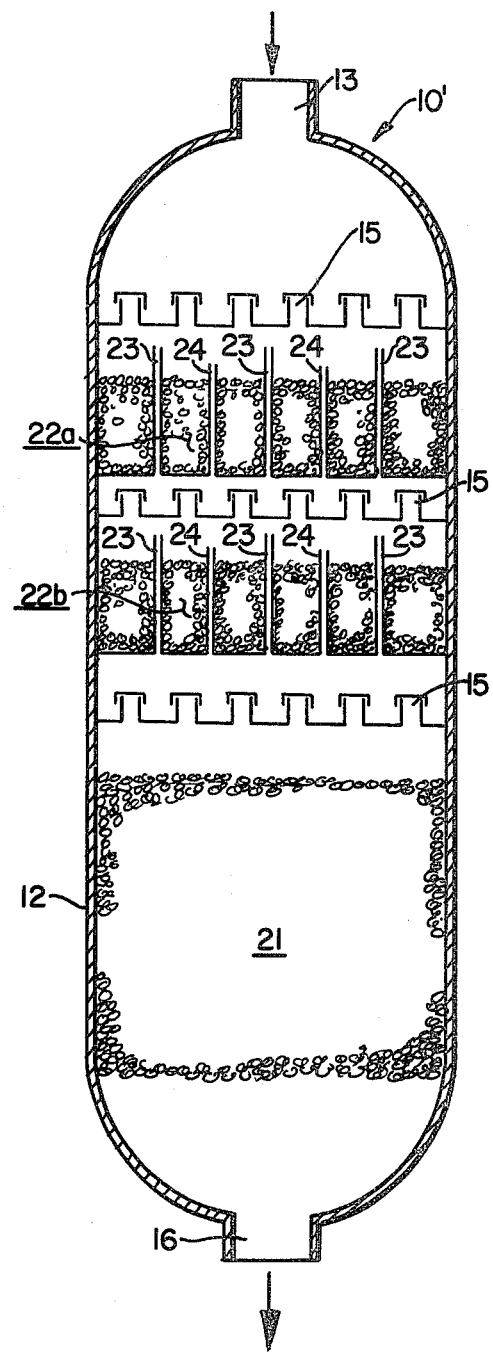
FIG.2                    FIG.2a

CATALYTIC REACTOR HAVING BED BYPASS

FIELD OF THE INVENTION

This invention is for a reactor having a liquid and gas mixture reacting in a fixed bed, and more particularly to a two phase, fixed bed reactor having a plurality of tiered beds and a low pressure drop bypass to each succeeding bed as a former bed becomes fouled or plugged. The invention is also applicable to packed absorption towers operating with cocurrent gas liquid flow.

BACKGROUND OF THE INVENTION

In the normal operation of fixed bed hydroprocessing oil refining reactors, the top of the catalyst bed often becomes fouled or plugged by organometallic compounds, polymeric material, carbonaceous deposits and particulates. The plugging of the catalyst bed is undesirable, since the resultant increase in pressure drop necessitates costly shut-downs and requires time-consuming repairs and maintenance.

In an effort to overcome this problem, many schemes have been devised, wherein each reactor is provided with more than one catalyst bed, and a plugged bed is bypassed to extend the operating life of the reactor.

One such bypass scheme is shown in U.S. Pat. No. 3,509,043 issued: Apr. 28, 1970. In this reactor, catalyst bed bypass tubes are used which contain rupture discs. These rupture discs are designed to burst open when the initial catalyst bed becomes fouled, and when a predetermined pressure drop is reached within the reactor. Under normal circumstances this bypass design will provide a workable means for extending the operability of the reactor. However, such a system is particularly sensitive to sudden changes in the feed flow rate of the reaction materials. These changes can often cause a premature bursting of the rupture discs.

Another U.S. patent illustrating the use of rupture discs is illustrated in U.S. Pat. No. 3,796,655 issued: Mar. 12, 1974.

In this system, the bypassed material is directed upwardly in order to provide a dislodging backflow, and thus, unfoul the crusted or plugged catalyst bed.

The bypassing schemes of these and other inventions achieve bypassing of the fouled catalyst bed with low pressure drop. High pressure drop bypassing is undesirable since the higher pressure drop puts a strain on the pumps and compressors which maintain the flow rate of the materials through the reactor. The low pressure drop for bypassing is achieved by employing a moving or a destructible component such as a rupture disc. These moving or destructible components are not reliable and can fail to operate or can operate prematurely.

The subject invention provides an improved bypass apparatus, wherein a low pressure drop bypass is achieved without the use of a moving or a destructible component, and further wherein the on-time of the reactor is extended several fold.

BRIEF SUMMARY OF THE INVENTION

This invention pertains to a reactor reacting a liquid and gas mixture in a fixed bed. The reactor comprises a reaction vessel into which both liquid and gas are introduced. The reactor has a main bed disposed therein, and at least one auxiliary bed disposed above the main bed. The auxiliary bed has separate liquid and gas bypasses comprising relatively different lengths of hollow tubing extending through the auxiliary bed. The gas bypass tubing projects to a greater height above the auxiliary bed than the liquid bypass tubing. This tubing arrangement provides a low pressure drop bypass for both said liquid and gas to the main bed, when the auxiliary bed becomes fouled.

The reactor will additionally contain a flow distributor above each bed to evenly spread the reactants through the entire bed.

A typical reactor of the invention will be a hydroprocessing reactor wherein different petroleum fractions are treated with hydrogen gas. The hydroprocessing reactions may utilize a catalyst containing a metal or a mixture of metals selected from the group of cobalt, molybdenum and nickel disposed on an alumina support. The reaction may remove, for example, impurities such as sulfur via a hydrodesulfurization reaction. Other important hydroprocessing reactions of this invention may include hydrodenitrogenation, hydrotreating, hydrofinishing, hydrogenation and hydrocracking.

It is an object of this invention to provide an improved reactor;

It is another object of the invention to provide a two phase, liquid and gas, fixed bed, reactor having an appreciably extended operating life;

It is a further object of this invention to provide a fixed bed reactor which effects a material bypass from a clogged or fouled bed to another bed with a low pressure drop.

These and other objects of this invention will be better understood and will become more apparent with reference to the following detailed description considered in conjunction with the accompanying drawings described below.

BRIEF DESCRIPTION OF THE DRAWINGS

FIG. 2 illustrates the reactor and bypassing apparatus of the invention in schematic view;

FIG. 2a depicts in schematic view an alternate embodiment of the invention shown in FIG. 2.

DETAILED DESCRIPTION OF THE INVENTION

Figure 1:
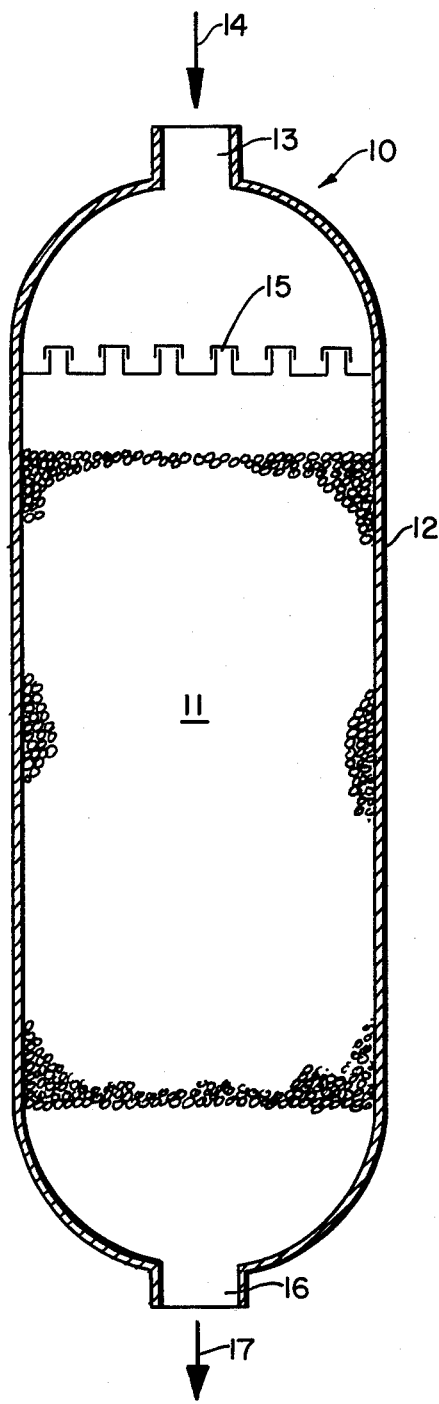
FIG. 1 is a schematic view of a typical hydroprocessing reactor having a single fixed bed without the bypassing apparatus of this invention.
Figure 1A:
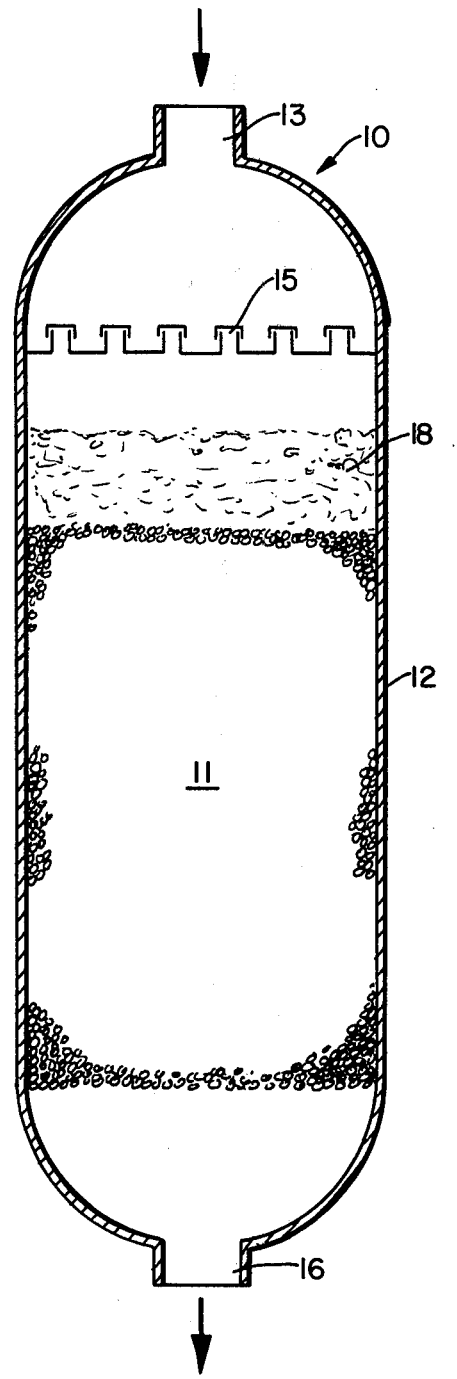
FIG. 1a is a schematic view of the reactor of FIG. 1, depicting the fouling of the bed.

Generally speaking, fixed bed hydroprocessing reactors of the type shown schematically in FIG. 1 are often limited in their operation by a build-up in the pressure drop in the catalyst bed 11, as the bed becomes fouled or plugged by impurities and particulates contained in the feed stock, as shown in FIG. 1a.

The reactor 10 comprises a vessel or reaction chamber 12. The feed stock, generally a petroleum fraction is fed into the mouth 13 of the vessel 12 along with a treating gas, such as hydrogen, as shown by arrow 14. A flow distributor 15 disposed above the catalytic bed 11 distributes the liquid and gas so that the catalyst bed 11 is evenly saturated. The reaction products leave the vessel 12 through exit port 16, as shown by arrow 17.

FIG. 1a shows the reactor of FIG. 1 with a plugged catalyst bed 11, as illustrated by the crusted top portion 18 of bed 11. The plugging of the reactor 10 is accompanied by a rapid build-up in pressure drop, as aforementioned.

The inventive bypass apparatus of the invention is illustrated in FIGS. 2 and 2a. Like components have been given the same designation for the sake of brevity. The reactor 10' is comprised of a reaction vessel 12 having an inlet 13 and an outlet 16, as mentioned before. The invention has a main catalyst bed 21 and an auxiliary catalyst bed 22 disposed above the bed 21, as shown. Distributors 15 are located above each bed 21 and 22, respectively.

The auxiliary catalyst bed 22 comprises different lengths of hollow tubing 23 and 24 extending therethrough. The longer tubes 23 project to a greater height above the auxiliary bed, than tubes 24.

When the catalyst bed 22 is not fouled or plugged, the bed 22 has a low resistance to flow in comparison to the resistance of the bypass tubing 23 and 24, a substantial part of the incoming materials will pass through the bed 22 to enter bed 21. A small amount of the materials will pass through tubing 23 and 24 before entering bed 21.

As the bed 22 becomes plugged and the resistance of bed 22 to flow increases, the incoming liquid will take the path of least resistance, and flow down through the shorter tubing 24, because the liquid will seek its lowest level, namely, the top of bed 22 and the adjacent short tubing 24. The incoming treating gas will then be free to flow in separate fashion through the longer tubing 23. Thus, the liquid and gas will flow to the main catalyst bed 21 through separate respective tubes 24 and 23, where it will now react.

The result of this inventive arrangement is that the reactor's operating life is extended because the reactor vessel 10' continues to operate despite the fouling of the upper catalyst bed 22.

An important feature of the invention is the low pressure drop accompanying the separate flow of the liquid and gas through respective tubes 24 and 23. This pressure drop would otherwise be high, if the tubing were of equal lengths and heights above bed 22, and the liquid and the gas had a mixed flow through the bypass tubing. Because of this feature, the operating life of the reactor is extended many fold.

As an illustration, assume that the height of the auxiliary bed 22 is three feet. Under the typical gas and liquid flow rates used in commercial hydroprocessing reactors, the pressure drop across an unfouled catalyst bed of three feet height is about 1 psi. The tubes 23 and 24 are sized so that if all the gas flows through the short and long tubes 24 and 23, the tubing pressure drop will be much higher than the pressure drop of bed 22. As an illustration and for the sake of discussion, assume that the tubing pressure drop is 10 psi (10 times the pressure drop of the unfouled catalyst bed 22). When the catalyst bed 22 is not fouled, the majority of the materials will, therefore, flow through the catalyst bed 22. A small flow of gas through the tubes 23 and 24 will not create any significant maldistribution problem. Any flow maldistribution will be corrected by the distributor 15 disposed above bed 21.

As the bed 22 begins to foul, an increasing fraction of the gas flow will be directed to the tubes 23 and 24. Until the bed 22 is severely fouled, the liquid will continue to flow through the bed 22, because the liquid seeks its lowest level. When the bed 22 is severely foulded so that the liquid can no longer flow through it, the liquid flow will be directed to the short tubes 24. Because only the longer tubes 23 will now be available for gas flow, the pressure drop will be higher than 10 psi. In this illustration, the pressure drop will be, say, 25 psi. Note that if all the tubes were of the same elevation above the bed and the gas and liquid flowed in the tubes as a two phase gas-liquid mixture, the bypassing pressure drop will be much higher than 25 psi.

Thus, the fouled catalyst bed is bypassed with a pressure drop of only 25 psi. If this fouled catalyst bed was not bypassed, the pressure differential would build up rapidly and force a unit shutdown.

FIG. 2a illustrates another embodiment of the invention depicted in FIG. 2. In this embodiment the single auxiliary catalyst bed 22 of FIG. 2 is replaced by at least two auxiliary catalyst beds herein designated 22a and 22b. Each of these beds operate in the same manner as described above, and each auxiliary bed will increase the operating life of the reactor in its own right. In this fashion, the operating life of the reactor 10' can be extended in multiples of the several fold increases common to only one auxiliary bed and bypass arrangement, as shown in FIG. 2.

Although the invention has been described in relation to a hydroprocessig reactor, the invention is not necessarily limited to such a reactor. The invention includes other reactors in which other liquid and gas mixtures react in fixed beds of catalyst. The invention also includes apparatus which uses similar flow arrangements. An example where similar flow arrangement may be used is a packed absorption tower with cocurrent flow of gas and liquid. In this example, the fixed or packed bed of solids does not have a catalytic role. The fixed bed of solids only facilitates contacting between the gas and the liquid.

EXAMPLES

Fouled catalyst bypassing for improving reactor run lengths has been demonstrated in an accelerated or simulated fouling test in the laboratory. Pressure drop build up in a six inch diameter column packed with 1/16 inch catalyst extrudates was measured using water and nitrogen feed. Catalyst fouling was produced by spiking the liquid feed with either coke or polymer particles.

Figure 3:
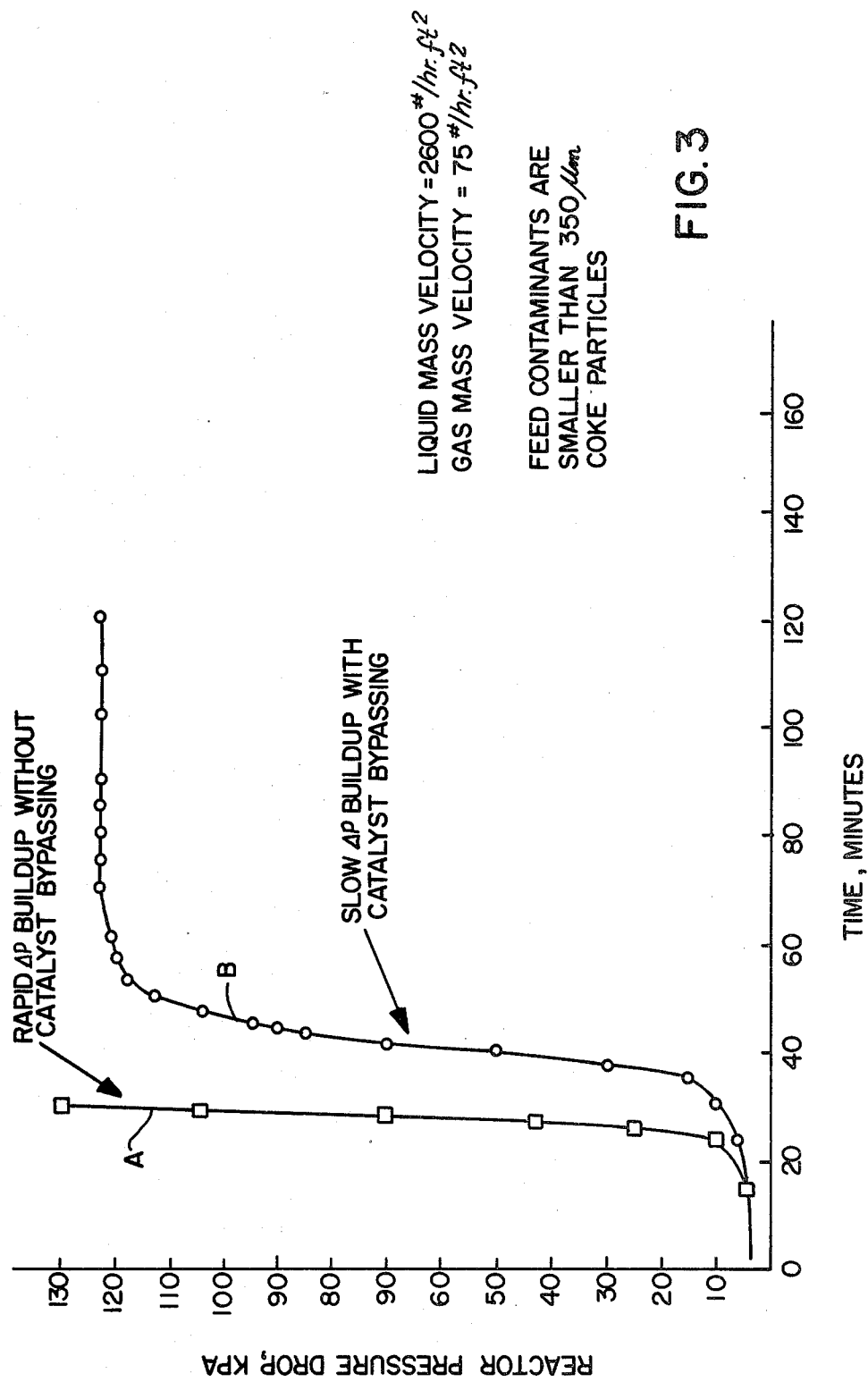
FIGS. 3 and 4 show a graphical comparison of the extended operation time of the reactor and bypassing apparatus of the invention illustrated in FIG. 2 as compared with the prior art reactor of FIG. 1.

In the first set of experiments, the contaminants in the feed were coke particles. FIG. 3 shows the pressure drop build up without any bypassing and also when one auxiliary catalyst bed as shown in FIG. 2 was bypassed as per the invention. Without catalyst bypassing, the rapid pressure drop build up necessitated that the reactor be shutdown in thirty minutes, as shown by curve A. The reactor run length of thirty minutes in the accelerated fouling test corresponds to a run length of several weeks to several months in a commercial reactor. With catalyst bypassing, the reactor was run for 120 minutes (Curve B), and could have been run longer. The leveling off of pressure drop is attributed to settling of heavy coke particles above the top auxiliary catalyst bed 22 (FIG. 2). Since the bypassed flow contained no contaminant coke particles, the lower bed 21 did not foul and the pressure drop remained constant.

Figure 4:
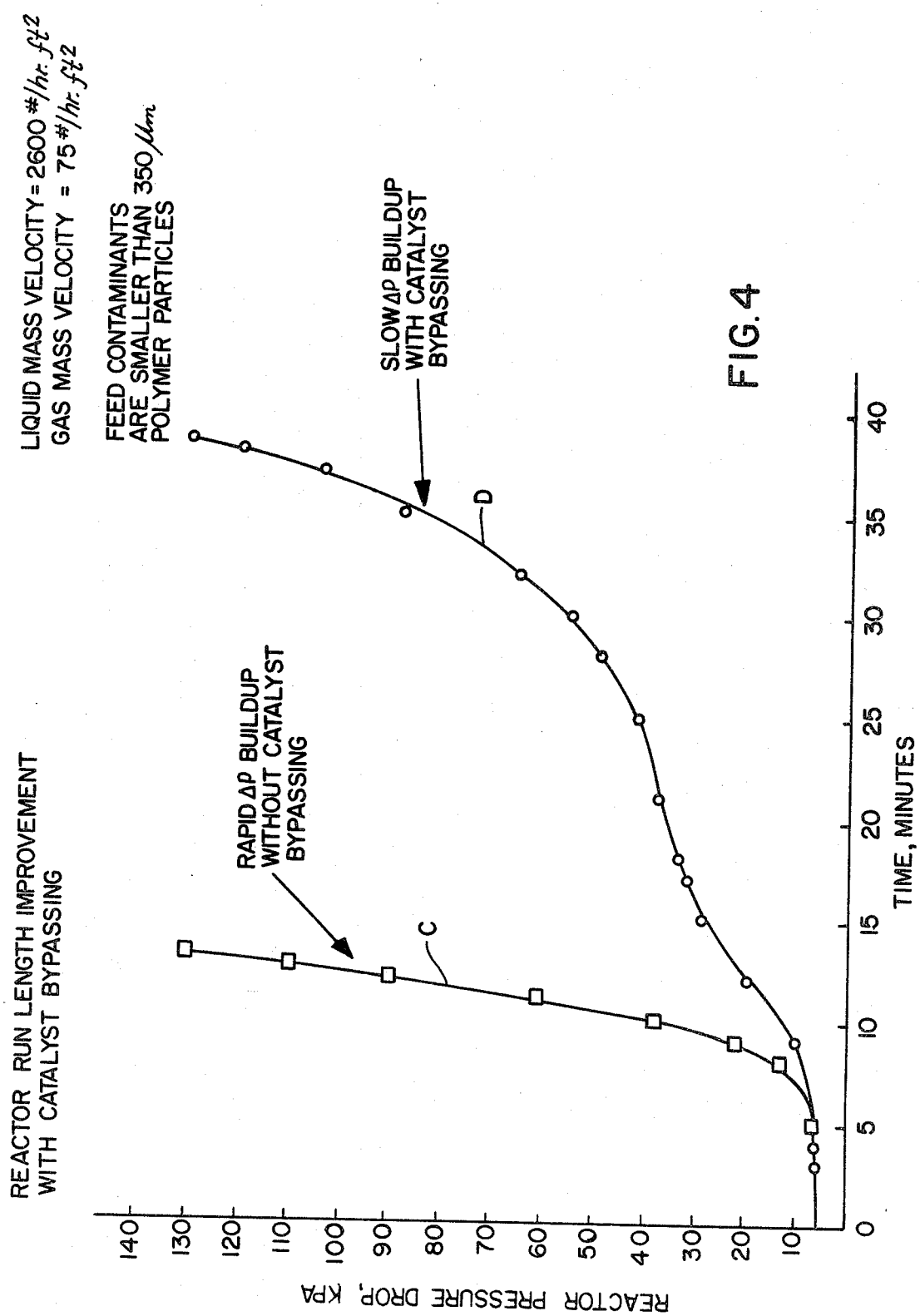

In a second set of experiments, contaminants in the feed were polymer particles. The polymer particles used had a density very close to that of water and, therefore, had no significant settling tendency. Thus, the bypassed flow produced fouling of the lower catalyst bed 21. FIG. 4 shows the advantageous effect of catalyst bypassing on reactor run length. The reactor run length increased by a factor of three, from 13 minutes (Curve C) to 38.5 minutes (Curve D).

The above drawings being of an exemplary and schematic nature are only meant to give an understanding of the invention.

Many modifications will naturally occur to the skilled practitioner of this art.

For example, as described in U.S. Pat. No. 3,524,731 issued Aug. 18, 1970, horizontal splash plates or baffles can be provided beneath the liquid and gas bypass tubes. These splash plates would distribute the bypassed material over a larger area of main bed 21. These splash plates or baffles can thus substitute for the flow distributor tray 15. Similarly, as also described in the above U.S. Pat. No. 3,524,731, cap plates may be provided above the longer gas bypass tubes 23 to prevent the liquid from above entering the tubes 23. Tubes 23 or 24 do not have to be the same size.

What is claimed is:

1. A reactor for reacting a two phase, gas and liquid mixture in a fixed bed of solids, comprising:
   a vessel;
   means to introduce both liquid and gas into said vessel;
   means to remove both liquid and gas from said vessel;
   at least one main bed disposed in said vessel; and
   at least one auxiliary bed disposed above said main bed having separate liquid and gas bypasses, said liquid and gas bypasses comprising relatively different lengths of hollow, invariably open tubing extending through said auxiliary bed, said gas bypass tubing projecting to a greater height above said auxiliary bed than said liquid bypass tubing in order to provide a low pressure drop bypass for both said liquid and gas to said main bed, when said auxiliary bed becomes fouled.

2. The reactor of claim 1, wherein there are at least two auxiliary beds disposed in tiers above said main bed.

3. The reactor of claim 2, further comprising a flow distributor above each bed.

4. The reactor of claim 1, further comprising a flow distributor above each bed.

5. The reactor of claim 1, including a source of said gas and wherein said gas comprises hydrogen.

6. The reactor of claim 1, wherein said beds comprise at least one catalyst.

7. The reactor of claim 6, wherein said catalyst consists of metals alone or in mixture, selected from the group consisting of cobalt, molybdenum and nickel, disposed on an alumina support.

8. The reactor of claim 1, including a source of said liquid and wherein said liquid comprises a petroleum fraction.

9. The reactor of claim 1, wherein the reactor is a hydroprocessor and includes means to carry out one or more of such reactions as: hydrogenation, hydrodesulfurization, hydrodenitrogenation, hydrotreating, hydrofinishing and hydrocracking.

10. A packed absorption tower, comprising:
    a vessel;
    means to introduce both liquid and gas into said vessel;
    at least one main bed of solids disposed in said vessel; and
    at least one auxiliary bed of solids disposed above said main bed having separate liquid and gas bypasses, said liquid and gas bypasses comprising relatively different lengths of hollow, invariably open tubing extending through said auxiliary bed, said gas bypass tubing projecting to a greater height above said auxiliary bed than said liquid bypass tubing in order to provide a low pressure drop bypass for both said liquid and gas to said main bed, when said auxiliary bed becomes fouled.

11. The absorption tower of claim 10, wherein there are at least two auxiliary beds disposed in tiers above said main bed.

12. The absorption tower of claim 11, further comprising a flow distributor above each bed.

13. The absorption tower of claim 10, further comprising a flow distributor above each bed.

* * * * *